United States Patent

[11] 3,602,215

| [72] | Inventor | John Parnell<br>Littleton, Colo. |
|---|---|---|
| [21] | Appl. No. | 759,871 |
| [45] | Patented | Aug. 31, 1971 |
| [73] | Assignee | Honeywell Inc.<br>Minneapolis, Minn. |

[54] ELECTRODE FAILURE DETECTION DEVICE
2 Claims, 5 Drawing Figs.

| [52] | U.S. Cl. | 128/2.06 B |
|---|---|---|
| [51] | Int. Cl. | A61b 5/04 |
| [50] | Field of Search | 128/2.05 M, 2.05 P, 206, 2.08, 2.1; 324/51, 64; 340/248, 253, 256 |

[56] References Cited
UNITED STATES PATENTS

| 3,066,284 | 11/1962 | McKinley et al. | 324/51 X |
|---|---|---|---|
| 3,144,019 | 8/1964 | Haber | 128/2.06 A |
| 3,135,264 | 6/1964 | Tischler et al. | 128/2.05 M |
| 3,347,223 | 10/1967 | Pacela | 128/2.1 |
| 3,433,217 | 3/1969 | Rieke | 128/2.1 X |

*Primary Examiner*—William E. Kamm
*Attorneys*—Arthur H. Swanson and Lockwood D. Burton ABSTRACT: Apparatus is provided for detecting the failure of a set of lead means used in conjunction with an ECG. amplifier. The apparatus includes a constant current source connected to the individual lead means for generating a voltage therebetween representative of the transmission impedance of the lead means. Amplifying and level detecting means are connected to the lead means for generating trigger pulses indicative of lead failure whenever the transmission impedance of the lead means exceeds a predetermined magnitude. An indicator means driven by the trigger pulses is included to indicate the occurrence of lead failure.

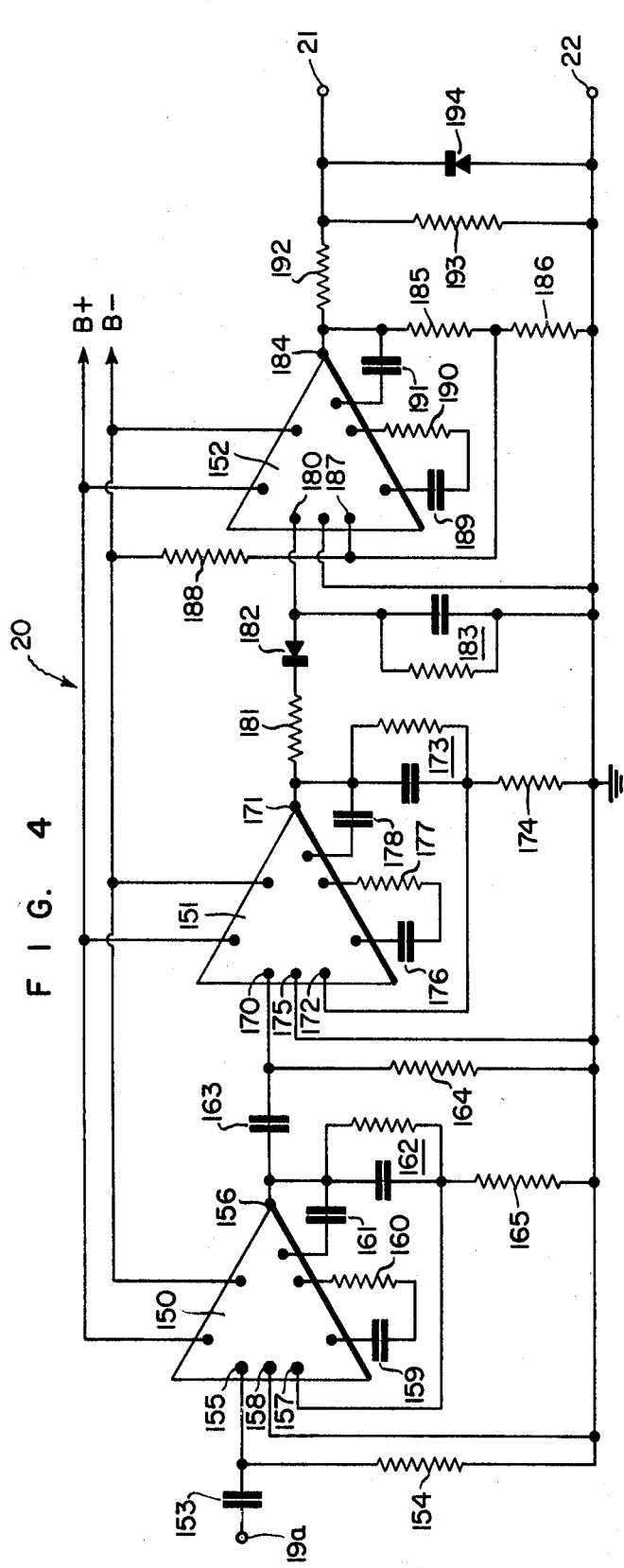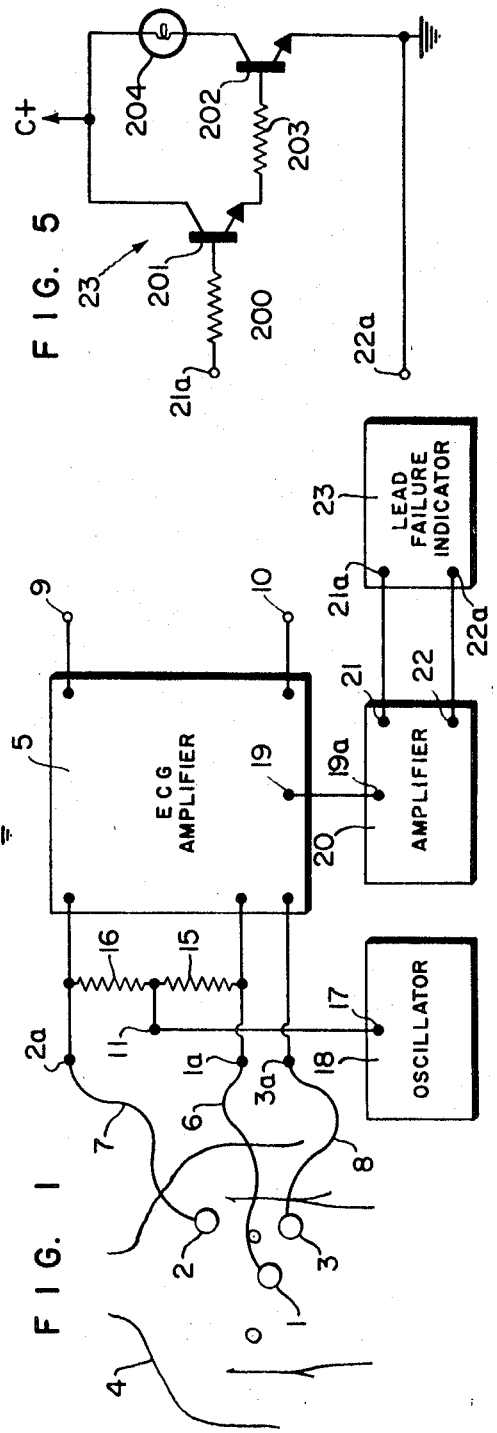
INVENTOR.
JOHN PARNELL

INVENTOR.
JOHN PARNELL

ELECTRODE FAILURE DETECTION DEVICE

The present invention relates to medical instrumentation and more particularly to apparatus for detecting the failure of a set of lead means used in conjunction with electromedical devices.

Lead means comprised of body electrodes with connecting wires attached thereto are used, for example, to transmit electrocardiographic (ECG) signals from the body of a patient to an ECG amplifier. The body electrodes, in situ, are positioned on the patient's skin to detect the ECG signals and the connecting wires are connected to the appropriate input terminals of the ECG amplifier to transmit the ECG signals thereto.

Lead failure, as the term is used herein, indicates a substantial increase in the impedance of such lead means to the transmission of ECG signals. The effect of lead failure is to significantly attenuate the ECG signals transmitted to, for example, the ECG amplifier, or even entirely prevent the transmission of the ECG signals thereto. Examples of a few of the common causes of lead failure are disconnection of the body electrodes from the patient's skin, substantial increases in the electrode-to-skin contact impedance caused by poor connection of the body electrodes with the patient's skin, and open-circuits in the lead means.

While lead failure is in itself a problem, the failure to promptly detect the failure of a set of lead means may be an even greater problem. For example the immediate detection of the failure of lead means used for the detection of ECG signals is particularly essential when such ECG signals are thereafter used to control the operation of a therapeutic device, such as a pacer, since the therapeutic device will not function properly in the absence of the ECG control signals.

It is accordingly an object of the present invention to provide novel lead failure detecting apparatus for detecting the failure of a set of lead means in situ on a patient.

It is more specifically an object of the present invention to provide lead failure detecting apparatus as set forth for detecting the failure of any one lead means in a set of three lead means in situ on a patient.

It is another object of the present invention to provide lead failure detecting apparatus as set forth including indicator means for indicating the failure of such lead means.

In accomplishing these and other objects, there has been provided a set of lead means for detecting the ECG signals of a patient. The lead means are in situ on a patient and a constant current source in the form of an oscillator is connected across the lead means to induce a constant current therein. Means for detecting potential difference are coupled across the pair of lead means to detect and transmit the voltage developed therebetween as a result of the constant current. This voltage designated lead failure voltage is proportional to the impedance of the pair of lead means and is transmitted to means for amplifying and detecting the magnitude of the lead failure voltage. Indicator means are provided to indicate lead failure whenever the impedance of the pair of lead means, as represented by the lead failure voltage, exceeds a predetermined magnitude.

A better understanding of the invention may be had from the following detailed description when read in connection with the accompanying drawings in which:

FIG. 1 is a block diagram of lead failure detecting apparatus according to the present invention used in conjunction with an ECG amplifier;

FIG. 4 is a schematic diagram of the amplifier of FIG. 1;

FIG. 5 is a schematic diagram of the lead failure indicator of FIG. 1.

Figure 2:
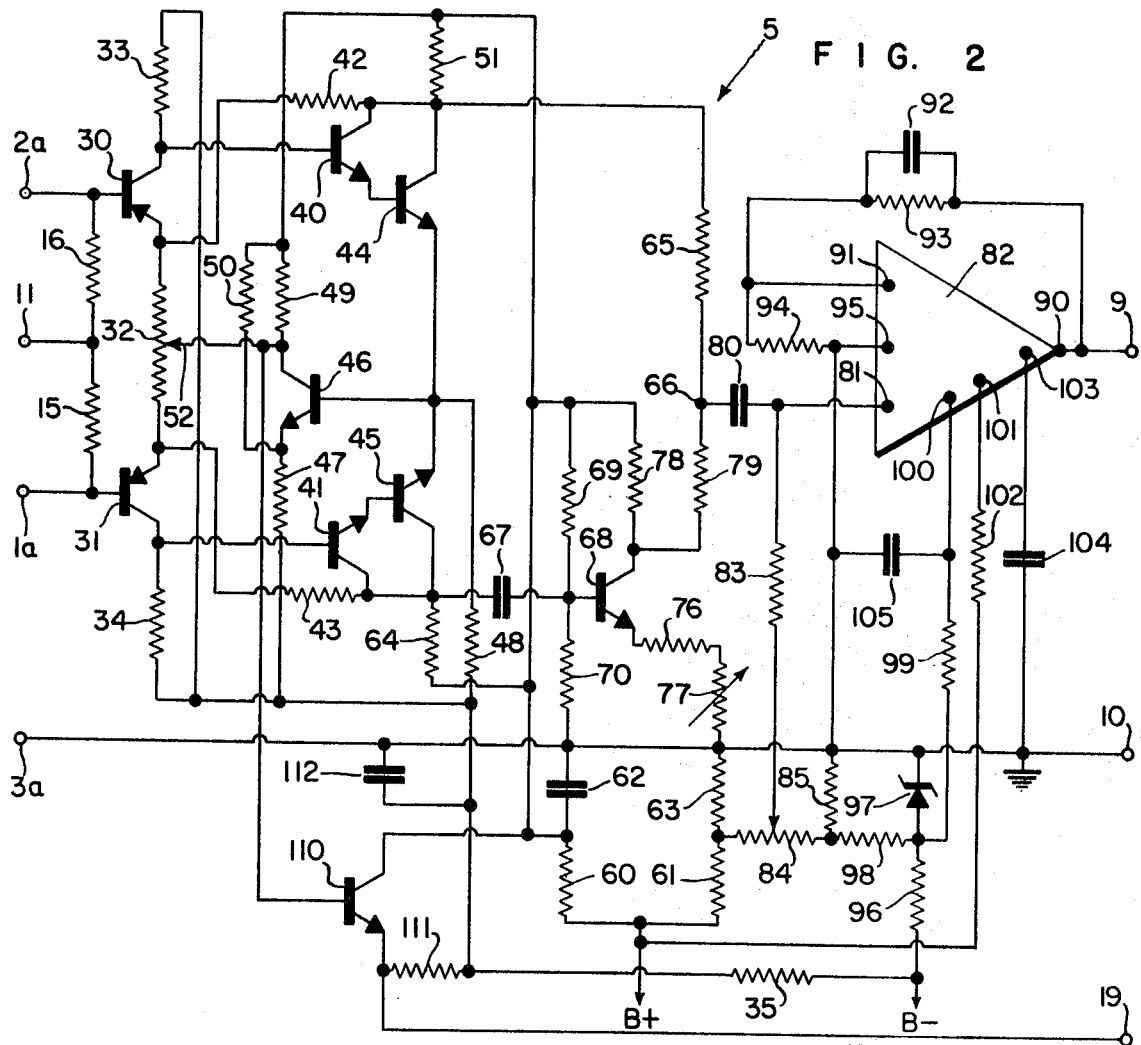
FIG. 2 is a schematic diagram of part of FIG. 1 including the ECG amplifier shown therein.

In the illustrated embodiment of the invention, there is shown in FIG. 1, body electrodes 1, 2 and 3 attached to the skin of a patient 4. The electrodes 1, 2 and 3 are connected to input terminals 1a, 2a and 3a, respectively, of an ECG amplifier by connecting wires 6, 7 and 8. The amplifier 5 has output terminals 9 and 10. Serially connected between the amplifier input terminals 1a and 2a, respectively, are resistors 15 and 16. The junction 11 between the resistors 15 and 16 is connected to the output terminal 17 of an oscillator 18. The ECG amplifier 5 also has an output terminal 19 connected to the input terminal 19a of an amplifier 20. The amplifier 20 has output terminals 21 and 22. The output terminals 21 and 22, in turn, are connected to the input terminals 21a and 22a of a lead failure indicator 23.

Referring now to FIG. 2, the ECG amplifier 5 shown therein comprises a two channel differential amplifier. The differential amplifier includes transistors 30 and 31, which transistors have their emitter electrodes commonly connected through a resistor 32. The base electrodes of the transistors 30 and 31 are connected, respectively, to the amplifier input terminals 2a and 1a, and the input terminal 3a is connected to ground. The collector electrodes of the transistors 30 and 31 are commonly connected through resistors 33 and 34, respectively. B— voltage is applied to the resistors 33 and 34 through a resistor 35.

The collector electrodes of the transistors 30 and 31 are in addition connected, respectively, to the base electrodes of transistors 40 and 41. The collector electrodes of the transistors 40 and 41 are connected back, respectively, through resistors 42 and 43 to the emitter electrodes of the transistors 30 and 31. The emitter electrodes of the transistors 40 and 41 are connected, respectively, to the base electrodes of transistors 44 and 45. The collector electrodes of the transistors 44 and 45 are connected in turn to the collector electrodes of the transistors 40 and 41, respectively. The emitter electrodes of the transistors 44 and 45 are commonly connected to the base electrode of a transistor 46. B— voltage is applied to the emitter electrode of the transistor 46 through the resistor 35 and a resistor 47. Similarly, B— voltage is applied to the emitter electrodes of the transistors 44 and 45 through the resistors 35 and a resistor 48. A capacitor 112 is also connected between ground and the resistor 35 to AC couple the B— voltage supply line to ground. The collector electrode of the transistor 46 is coupled to its emitter electrode through resistors 49 and 50. The junction between the resistors 49 and 50 is connected through a resistor 51 to the collector of the transistor 44. Further, the resistor 32 has an adjustable voltage pickoff 52 which is connected to the collector electrode of the transistor 46.

To apply positive DC bias voltage to the appropriate transistors of the differential amplifier hereinbefore described B+ potential is applied to a common junction between resistors 60 and 61. The resistors 60 and 61, respectively, are connected to ground potential through a capacitor 62 and a resistor 63. The junction between the capacitor 62 and the resistor 60 is connected through the resistors 49, 51 and 64, respectively, to the collector electrodes of the transistors 46, 44 and 45. The B+ and B— voltages before and hereinafter referred to in this specification were 12+ and 12— volts, respectively, in an exemplary apparatus constructed in accordance with the present invention.

The collector electrodes of the transistors 44 and 45, respectively, provide the two output terminals of the two channels of the differential amplifier above described, and the collector electrode of the transistor 44 is connected through a resistor 65 to a summing junction 66. The collector electrode of the transistor 45, however, is connected through a capacitor 67 to the base of a transistor 68. The transistor 68 serves as a phase inverter, as is hereinafter explained. The base electrode of the transistor 68 is biased by connecting therefrom resistors 69 and 70, respectively, to the junction between the resistor 60 and the capacitor 62, and to ground. In addition, the emitter electrode of the transistor 68 is connected through a series connected resistor 76 and a variable resistor 77 to ground. The collector of the transistor 68 is connected through a resistor 78 to the junction between the capacitor 62 and the resistor 60. Further the output electrode of the transistor 68, i.e., its collector electrodes is connected through a resistor 79 to the summing junction 66.

The summing junction 66 is connected through a capacitor 80 to the input terminal 81 of an operational amplifier 82. The terminal 81, in turn, is connected through a resistor 83 to the adjustable voltage pickoff of a resistor 84. One terminal of the resistor 84 is connected to the junction between the resistors 61 and 63, and the other terminal is connected through a resistor 85 to ground. The amplifier 82 is a linear integrated circuit of the type manufactured by Fairchild Semiconductor specification sheet titled "UA702 c High Gain, Wideband DC Amplifier" dated March 1967. The amplifier output terminal 90 is connected back to a second input terminal 91 through a network comprising a parallel connected capacitor 92 and resistor 93. A resistor 94 is connected between the terminal 91 and a reference terminal 95. Ground is applied to the reference terminal 95.

To provide supply voltages for the amplifier 82, a resistor 96 and a Zener diode 97 are connected in series. The zener diode 97 is connected to ground and B− voltage is applied to the resistor 96. In addition, one terminal of a resistor 98 is connected to the junction between the resistors 84 and 85. The other terminal of the resistor 98 is connected to the junction between the diode 97 and the resistor 96. The junction between the diode 97 and the resistor 96 is, in turn, connected through a resistor 99 to the amplifier voltage supply terminal 100 to apply a negative supply voltage thereto. The terminal 100 is connected through an AC coupling capacitor 105 to ground. B+ voltage is applied to the amplifier voltage supply terminal 101 through a resistor 102. In addition, the frequency compensation terminal 103 of the amplifier 82 is connected through a capacitor 104 to ground, and the ECG amplifier output terminals 9 and 10 are connected, respectively, to the integrated amplifier output terminal 90 and ground.

The base of a transistor 110 is also connected to the voltage pickoff 52 of the resistor 32. The transistor 110 has its collector electrode connected to the junction between the capacitor 62 and the resistor 60 to receive positive bias potential. The emitter electrode of the transistor 110 is connected through a resistor 111 and the resistor 35 to B− voltage. Additionally, the emitter electrode of the transistor 110 is connected to the ECG amplifier output terminal 19.

Figure 3:
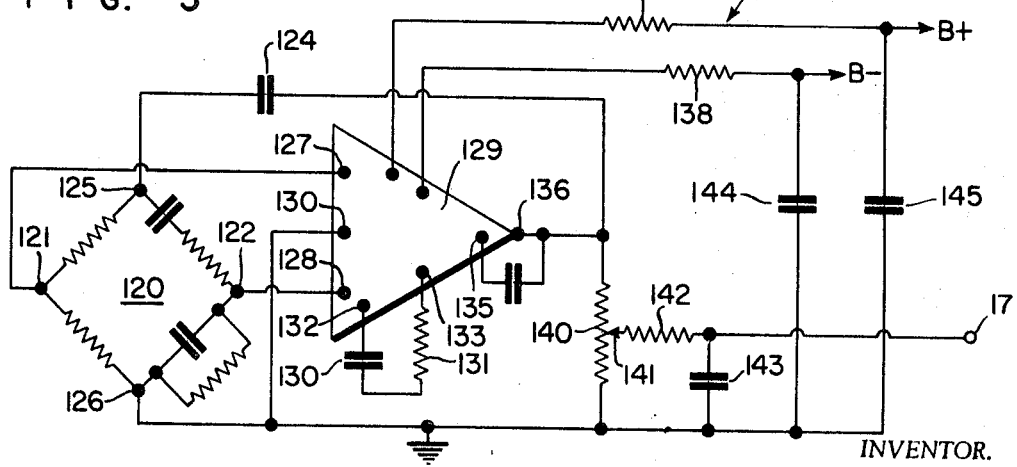
FIG. 3 is a schematic diagram of the oscillator of FIG. 1.

There is shown in FIG. 3 a conventional Wien bridge oscillator. A bridge 120 is shown with output terminals 121, 122 and feedback input terminals 125, 126. The bridge 120 was tuned in an exemplary embodiment of the invention to resonant at 1000 Hertz. The bridge output terminals 121 and 122 are connected to the input terminals 127 and 128 of an amplifier 129. The amplifier 129 has a reference terminal 130 connected to ground and in an exemplary apparatus was a Fairchild Semiconductor linear integrated circuit model uA709c, a description of which may be found in the Fairchild Semiconductor specification titled "uA709c High Performance Operational Amplifier" dated Mar. 1967. The amplifier 129 is connected in a conventional manner having a capacitor 130 and a resistor 131 connected in a conventional manner having a capacitor 130 and a resistor 131 connected across terminals 132 and 133 to provide input frequency compensation. A capacitor 134 was connected from the amplifier terminal 135 to the amplifier output terminal 136 to provide output frequency compensation. B+ and B− voltages are supplied to the amplifier supply voltage terminals through resistors 137 and 138, respectively. The B+ and B− supply lines are AC coupled to ground, respectively, by the capacitors 144 and 145. The amplifier output terminal 136 is connected back to the bridge input terminal 125 to provide feedback and the bridge input terminal 126 is connected to ground. A load resistor 140 is connected between the amplifier output terminal 136 and ground. The load resistor 140 has an adjustable voltage pickoff 141 to which is connected one terminal of a resistor 142. A capacitor 143 is connected between the other terminal of the resistor 142 and ground. The resistor 142 and the capacitor 143 comprises a low pass filter which was designed in the exemplary apparatus to pass the base frequency of the Wien bridge oscillator, i.e. 1000 Hertz while attenuating higher frequency harmonics. The junction between the resistor 142 and the capacitor 143 is connected to the oscillator output terminal 17.

FIG. 4 shows the amplifier 20 which as is hereinafter explained provides amplification for the voltage representative of lead failure. The amplifier 20 includes operational amplifiers 150–152 used in an exemplary apparatus were model uA709c Fairchild Semiconductor linear integrated circuits. B+ and B− voltages are supplied to the supply voltage terminals of each of the amplifiers 150–152.

The amplifier 20 has a high frequency filter comprised of a capacitor 153 and a resistor 154 connected between its input terminal 19a and ground. This high frequency filter was designed in an exemplary apparatus to attenuate the patient's ECG while passing the 1000 Hertz oscillator base signal. The junction of the capacitor 153 and the resistor 154 is connected to the input terminal 155 of the amplifier 150. The output terminal 156 of the amplifier 150 is fed back through a low pass filter stage 162 to a second input terminal 157 of the amplifier 150. The filter 162 is connected to ground through the resistor 165. The amplifier 150 has ground connected to its reference terminal 158. A series connected capacitor 159 and a resistor 160 are connected to the amplifier 150 to provide input frequency compensation. A capacitor 161 is connected to the amplifier 150 to provide output frequency compensation. The aforementioned low pass filter stage 162 connected to the amplifier terminal 156 was designed to transmit the 1000 Hertz oscillator base frequency while attenuating higher harmonics.

A high pass filter comprised of a capacitor 163 and a resistor 164 is further connected between the amplifier output terminal 156 and ground. The junction between the capacitor 163 and the resistor 164 is connected to the input terminal 170 of the amplifier 151. The amplifier 151 has its output terminal 171 connected back to the input terminal 172 through a low pass filter 173. The filter 173 is connected to ground through a resistor 174. The amplifier has ground connected to its reference terminal 175. A series connected capacitor 176 and resistor 177 are connected to the amplifier 151 to provide input frequency compensation. A capacitor 178 is connected to amplifier 151 to provide output frequency compensation. The high pass filter comprised of the capacitor 163 and the resistor 164, and the low pass filter 173 are, respectively, designed in an exemplary apparatus to pass the 1000 Hertz oscillator base frequency.

Connected between the amplifier output terminal 171 and the input terminal 180 of the amplifier 152 is a series connected resistor 181 and diode 182. Further, connected between the terminal 180 and ground is low pass filter 183. The low pass filter 183 was designed as the other filters in the amplifier 20 to pass the 1000 Hertz oscillator base frequency. Connected between the output terminal 184 of the amplifier 152 and ground is series connected resistor 185 and 186. The junction between the resistors 185 and 186 is connected back to the amplifier input terminal 187. B− bias voltage is also applied to the amplifier terminal 187 through a resistor 188. A series connected capacitor 189 and resistor 190 are connected to the amplifier 152 to provide input frequency compensation. A capacitor 191 is connected to the amplifier 152 to provide output frequency compensation. Connected between he amplifier output terminal 184 and ground are series connected resistors 192 and 193. A diode 194 is connected in shunt with the resistor 193. The output terminal 21 of the amplifier 20 is connected to the junction between the resistors 192 and 193. Additionally, the output terminal 22 of the amplifier 20 is connected to ground.

Referring to FIG. 5, there is shown the lead failure indicator 23 having its input terminal 21a connected through a resistor 200 to the base electrode of a transistor 201. The input terminal 22a of the indicator 23 is connected to ground. C+ potential, which has +5 volts in an exemplary apparatus, is applied to the collector electrode of the transistor 201. The emitter electrode of the transistor 201 is connected to the base electrode of the transistor 202 through a resistor 203. The emitter electrode of the transistor 202 is connected to ground. A lamp 204 is connected between C+ potential and the collector electrode of the transistor 202.

In operation of the present invention, the body electrodes 103 provide terminal means for receiving ECG signals from the skin of the patient 4, and these ECG signals are transmitted to the ECG amplifier 5 through the respective connecting wires 6, 7 and 8. The electrodes 1 and 2 are positioned on opposite sides of the patient's heart, as shown in FIG. 1, thereby to detect substantially the maximum potential difference developed during each heart beat. The electrode 3 is grounded and is placed approximately equidistant from each electrode 1 and 2, thereby to provide a common reference potential and return lead means. The ECG potential transmitted by the electrode 1 is amplified by the differential amplifier channel comprised of the transistors 30, 40 and 44, and appears as a first differential output signal on the collector electrode of the transistor 44. The ECG potential transmitted by the body electrode 2 is amplified by the differential amplifier channel comprised of the transistors 31, 41 and 45, and appears as a second differential output signal on the collector electrode of the transistor 45.

Since extraneous electrical signals, i.e. electrical signals which are not representative of the patient's ECG often are also transmitted by the body electrodes 1-3, the aforementioned first and second differential output signals may each be thought of as having an ECG and an extraneous component. The ECG components of the first and second differential output signals are 180° out-of-phase, relative to each other, while the extraneous components are predominantly inphase. To eliminate a high percentage of these extraneous components, i.e. to accomplish common mode rejection, the signals appearing on the emitter electrodes of the transistors 44 and 45 are added and fed back through the transistor 46 to the emitter electrodes of the transistors 30 and 31. This feedback circuit serves to reject the common mode extraneous input signal components so that the average collector voltages and collector currents of the transistors 30 and 31 will be constant regardless of the average voltage input level on terminals 1a and 2a. Further to insure high common mode rejection, the second differential output signal is then phase inverted by the transistor 68. The first differential output signal and the phase inverted second differential output signal are summed at the summing point 66 whereat the ECG components combine into a single ECG signal, and any residual extraneous components effectively cancel since they have now been shifted out-of-phase with respect to each other. The ECG signals at the summing point 66 are amplified by the operational amplifier 82 and appear across the ECG amplifier output terminals 9 and 10.

Directing attention now to the operation of the lead failure apparatus, the oscillator 18 provides a low level constant AC voltage at a frequency of 1000 Hertz. This constant voltage is applied to the junction of the resistors 15 and 16. Since the resistors 15 and 16 each have very high impedances, substantially first and second constant currents are provided, respectively to the first lead means comprised of the connecting wire 6 and the body electrode 1, and to the second lead means comprised of the connecting wire 7 and the body electrode 2. The first and second constant currents introduced into the first and second lead means, respectively, flow through the skin of the patient 4 and are returned to the lead failure apparatus through the common return lead comprised of the body electrode 3 and the connecting wire 8.

As a result of the first constant current provided through the resistor 15, a first 1000 Hertz voltage is developed between the ECG amplified terminals 1a and 3a which is proportional to the transmission impedance of the first lead means and the common return lead means. Similarly, as a result of the second constant current provided through the resistor 16, a second 1000 Hertz voltage is developed between the ECG amplifier terminals 2a and 3a which is proportional to the transmission impedance of the second lead means and the common return lead means. Since the ECG amplifier 5 has a high input impedance, the first 1000 Hertz voltage between the terminals 1a and 3a appears upon the emitter electrode of the transistor 31. Similarly, the second 1000 Hertz voltage between the terminals 2a and 3a appears upon the emitter electrode of the transistor 30. These first and second 1000 Hertz voltages are in phase with respect to each other and add on the resistor 32 to form a lead failure voltage at the voltage pickoff 52. This voltage is called the lead failure or control voltage since it is proportional to the combined transmission impedance of the first, second and common return lead means and may be used to indicate lead failure.

The lead failure voltage generated at the voltage pickoff 52 is fed through the transistor 110 to the amplifier 20, the transistor 110 acting as an impedance changer. The lead failure voltage is then amplified by the operational amplifier 150 and 151 in the amplifier 20. The high and low pass filters in cascade with the amplifiers 150 and 151 act in combination as a band pass filter to only transmit the 1000 Hertz lead failure voltage which is desired to be detected. The lead failure voltage is also rectified by the diode 182 and applied to the input terminal 180 of the operational amplifier 152. The amplifier 152 has a bias voltage applied to its input terminal 187 and function as a level detector or trigger to amplify only those lead failure voltages having a magnitude exceeding the threshold level established by the bias voltage applied to its input terminal 187. It is noted that the threshold level of the amplifier 150 is predetermined not to be exceeded by the lead failure voltage generated when the body electrodes 1, 2 and 3 make satisfactory low impedance contact with the patient's skin and no open circuits exist in the lead means.

Assuming however, for the instant that the lead failure voltage at terminal 180 exceeds the threshold level of the amplifier 152, an output signal would then be generated and transmitted to the base of the transistor 201. This output signal causes the transistor 201 to conduct. The conduction of the transistor 201, in turn, causes the transistor 202 to conduct whereupon the lamp 204 would illuminate to indicate lead failure.

To illustrate an occurrence of lead failure, it is assumed that the body electrode 1 has become detached from the patient's skin. The first constant circuit provided through the resistor 15 no longer can flow since the first lead means is open circuited. The constant voltage generated by the oscillator 17 therefore appears on the emitter electrode of the transistor 31 and the lead failure voltage on the voltage pickoff 52 therefore proportionally increases. The lead failure voltage appearing as an input to the operational amplifier 152 then correspondingly increases whereby it will exceed the threshold level of the amplifier 152. The lamp 204 thus will be then lighted to indicate lead failure. Similarly an indication of lead failure voltage would result if an open circuit appeared in the second lead means, between the ECG amplifier terminal 2a and the patient's skin, or in the common return lead means, between ground and the patient's skin. Additionally, lead failure may occur when the electrode-to-skin contact impedance increases to a value at which the lead failure voltage generated by the first and second constant currents increases sufficiently to cause the threshold level of the amplifier 152 to be exceeded.

Thus, apparatus has been provided in conjunction with an ECG amplifier for detecting and indicating the failure of lead means used to detect and transmit a patient's ECG signal.

The embodiments of the invention in which an exclusive property or privilege is claimed are defined as follows:

1. Apparatus for detecting the failure of a set of electromedical lead means wherein said set of lead means includes first, second and third lead means for application to the skin of a patient, said lead failure apparatus comprising;

a first constant current source connected between said first and third lead means whereby to produce a first electrical potential difference between said first and third lead means representative of a first transmission impedance, between said first and third lead means;

a second constant current source connected between said second and third lead means whereby to produce a second electrical potential difference between said second and third lead means representative of second transmission impedance, between said second and third lead means;

said first and second transmission impedance being characterized by a significant change upon the occurrence of a lead failure;

means for generating a control voltage proportional to the sum of said first and second electrical potential differences, said voltage being characterized by a significant change in magnitude corresponding to said change in said first and second transmission impedances; and trigger signal generating means responsive to said voltage for producing a trigger signal whenever the magnitude of said voltage exceeds a predetermined value, said trigger signal being indicative of lead failure;

means connected to said trigger signal generating means for displaying an indication representative of an occurrence of said trigger signal.

2. The invention recited in claim 1 wherein:

said first and second constant current sources include an oscillator common to both said first and said second constant current sources having a base frequency; and including:

filter means connecting said means for generating a voltage proportional to the sum of said first and second electrical potential differences with said trigger signal generating means, said filter means being operable to transmit to said trigger signal generating means only electrical signals of substantially said oscillator base frequency.